United States Patent [19]

Okita et al.

[11] Patent Number: 4,891,513
[45] Date of Patent: Jan. 2, 1990

[54] PHOTOSENSOR BLOCK HAVING AN ADJUSTABLE MOUNTING STRUCTURE TO PERMIT FINE POSITIONING OF THE PHOTOSENSOR BLOCK INCLUDED IN THE PHOTOSENSOR BLOCK

[75] Inventors: Masao Okita; Tadami Sugawara; Hiroshi Yoshida, all of Furukawa, Japan

[73] Assignee: Alps Electric Co., Ltd., Tokyo, Japan

[21] Appl. No.: 217,744

[22] Filed: Jul. 12, 1988

Related U.S. Application Data

[62] Division of Ser. No. 868,998, May 30, 1986, Pat. No. 4,774,613.

[30] Foreign Application Priority Data

May 30, 1985 [JP] Japan ................... 60-115269

[51] Int. Cl.⁴ .................. G11B 5/596; G11B 5/12
[52] U.S. Cl. .................. 250/239; 360/109; 250/231 SE
[58] Field of Search .......... 250/239, 231 SE; 360/75–78, 104–109, 130.34, 86, 97–99

[56] References Cited

U.S. PATENT DOCUMENTS

| | | | |
|---|---|---|---|
| 3,305,931 | 2/1967 | Kerr | 250/237 G |
| 4,039,826 | 8/1977 | Wingate | 250/237 G |
| 4,047,586 | 9/1977 | Dlugos | 250/237 G |
| 4,466,032 | 8/1984 | Saito | 360/130.34 |
| 4,609,954 | 9/1986 | Bolton et al. | 360/106 |
| 4,774,613 | 9/1988 | Okita et al. | 360/109 |

*Primary Examiner*—David C. Nelms
*Assistant Examiner*—Stephone B. Allen
*Attorney, Agent, or Firm*—Guy W. Shoup; David W. Heid

[57] ABSTRACT

A photosensor block for use with a zero track sensor of a disk drive unit or the like wherein adjustment of the position of a photosensor can be effected simply with accuracy. In the photosensor block, a photosensor forms a side of a deformable parallelepiped and is mounted on a mounting member having a pair of parallel elastic members which form a pair of opposing sides of the parallelepiped. An interconnecting portion of the mounting member between the elastic members is secured either to the photosensor or to a base member which is mounted on a stationary section of the unit and forms the remaining side of the parallelepiped. Opposite ends of the elastic members are removably connected to the other of the photosensor and the base member. An adjusting member is adjustably mounted on the base member for pressing against a side face of one of the elastic members for fine adjustment of the position of the photosensor.

7 Claims, 13 Drawing Sheets

PHOTOSENSOR BLOCK HAVING AN ADJUSTABLE MOUNTING STRUCTURE TO PERMIT FINE POSITIONING OF THE PHOTOSENSOR BLOCK INCLUDED IN THE PHOTOSENSOR BLOCK

This application is a division of application Ser. No. 868,998, filed May 30, 1986, now U.S. Pat. No. 4,774,613.

BACKGROUND OF THE INVENTION

This invention relates to a photosensor block suitable for use, for example, with a zero track sensor of a disk drive unit, and more particularly to a photosensor block which includes a photosensor mounted for adjustment thereon.

Generally, a photosensor is employed in a control device which includes a stepping motor for controlling a position of a moving body. Such a photosensor normally includes a light emitting element and a light receiving element arranged in an opposing relationship with slits located intermediately and parallelly between the elements for detecting a position of a body as the body interrupts a path of a light beam through the slits.

One of devices which incorporate a moving mechanism including a stepping motor therein is a disk drive unit such as, for example, a disk drive unit illustrated in FIG. 16. Referring to FIG. 16, a disk drive unit includes as principal components a frame 51, a holder 52 located on the frame 51, a loading member 54 for loading a cartridge 53 inserted into the holder 52 onto a turntable and for ejecting it therefrom, a carriage 56 including a magnetic head not shown for effecting recording on and reproduction from a disk 55 contained in the cartridge 53, and a stepping motor 57 for feeding the carriage 56 in a radial direction of the disk 55. A photosensor 58 is located at a portion of the frame 51 behind the carriage 56, and a shutter member 59 is mounted to extend from a rear end of the carriage 56 and is so positioned to move across a gap 60 between slits formed in an opposing relationship in the photosensor 58. Since the shutter member 59 is securely mounted on the carriage 56, it moves together with the carriage 56. Accordingly, if the shutter member 59 and the photosensor 58 are positioned relative to each other such that a path of a light beam from a light emitting element to a light emitting element of the photosensor 58 is interrupted by the shutter member 59 when the magnetic head is positioned for the zero track of the disk 55, the position of the magnetic head for the zero track can be detected.

As described above, the photosensor 58 is securely mounted on the frame 51, but it is necessary to effect adjustment to attain accurate zero track positioning when the photosensor 58 is assembled. Normally, the adjustment is such that the shutter member 59 is positioned to the zero track position and then the photosensor 58 is slightly moved to a position in which the shutter member 59 interrupts a path of a light beam whereafter it is secured to the position by means of a bolt. However, according to such an adjusting process, adjustment of the photosensor 58 is difficult and the photosensor 58 may be brought out of position upon fastening with a bolt, and hence much time is required for such adjustment.

SUMMARY OF THE INVENTION

It is an object of the present invention to provide a photosensor block wherein adjustment of the position of a photosensor can be effected simply with accuracy.

In order to attain the object, according to the present invention, a photosensor block comprises a photosensor, a photosensor mounting member including a pair of parallel elastic members each in the form of a plate for supporting the photosensor for parallel movement thereon, and a base member mounting the photosensor mounting member thereon and having an adjusting member mounted thereon for pressing against a side face of one of the elastic members for fine adjustment of the position of the photosensor.

BRIEF DESCRIPTION OF THE DRAWINGS

FIG. 1(c) is a rear elevational view of the zero track sensor of FIG. 1(a);

FIG. 1(d) is a front elevational view of a mounting member for the photosensor;

FIG. 1(e) is a right-hand side elevational view of the mounting member of FIG. 1(d)

DETAILED DESCRIPTION OF THE PREFERRED EMBODIMENTS

Figure 1A:
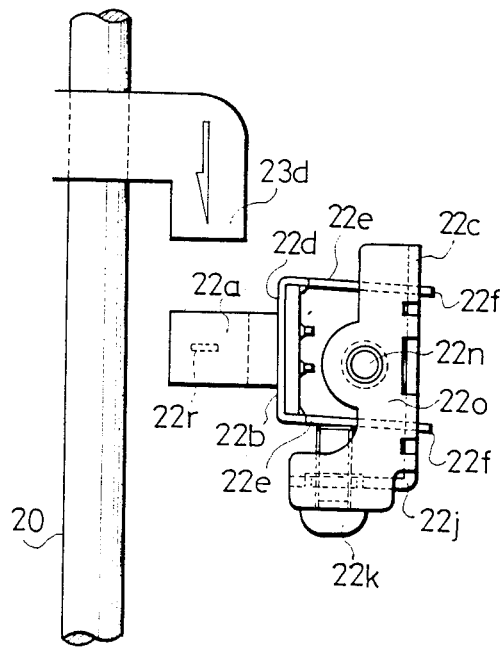
FIG. 1(a) is a plan view illustrating a relation between a zero track sensor according to a first embodiment of the present invention and a shutter for cooperation therewith.

Now, the present invention will be described in connection with preferred embodiments thereof wherein a photosensor block is applied for a zero track sensor of a disk drive unit with reference to the drawings.

General Construction

At first, a general construction of a disk drive unit in which a zero track sensor is incorporated will be described with reference to FIGS. 2, 3, 4, 5 and 6 of the drawings.

A disk drive unit which is shown as an embodiment in those figures includes as principal components a frame 1, a housing 2 mounted at a predetermined position of the frame 1 from below, a loading member 4 mounted for sliding movement at a portion of an upper face of the frame 1 adjacent a cartridge insertion side from which a disk cartridge 3 is inserted into the unit, a holder 7 mounted in engagement with cam portions 6 of side walls 5a formed on opposite sides of the loading member 4 for holding a disk cartridge 3 thereon, a loading member driving mechanism 8 located on the upper face of the frame 1 for driving the loading member 4, a motor 10 located on a lower face of the housing 2 for rotationally driving a turntable 9 projected upwardly above the upper face of the housing 2 and constituting a disk driving mechanism together with the turntable 9, a carriage 12 mounted on the upper face of the housing 2 for feeding movement in a radial direction of a disk 11, a feeding movement in a radial direction of a disk 11, a feeding mechanism 14 including a stepping motor 13 for feeding the carriage 12, and a manual ejecting mechanism 15 for manually ejecting a cartridge 3.

Figure 6:
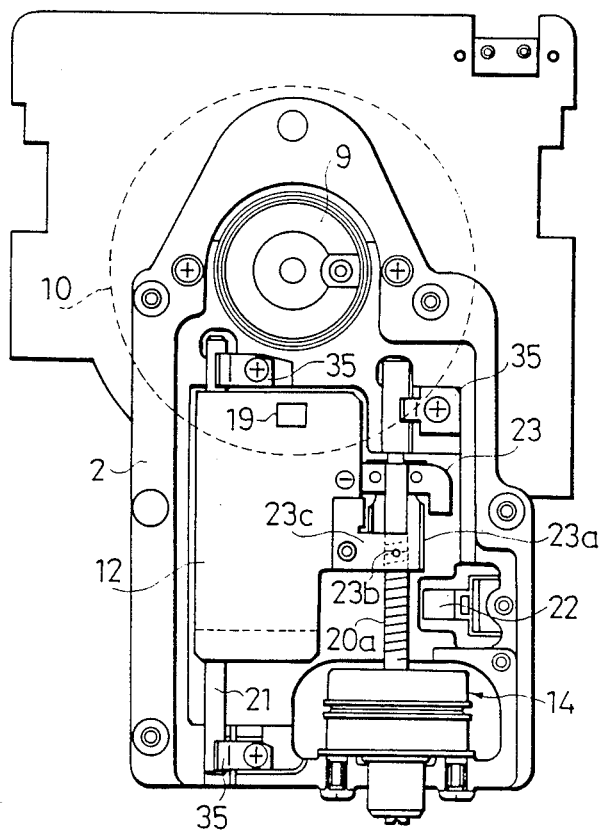
FIG. 6 is a plan view illustrating a housing and a carriage feeding mechanism of the disk drive unit.

Located on the housing 2 which is formed independently of the frame 1 are, as seen in FIG. 6, the motor 10 having the turntable 9 on the top thereof, the stepping motor 13 for rotationally driving a screw shaft 20 which has a screw groove 20a formed therein for feeding the carriage 12, the carriage 12 having one side thereof engaged with the screw groove 20a of the screw shaft 20 and the other side thereof supported for sliding movement on a guide bar 21, and a zero track sensor 22 for detecting a zero track position of a magnetic head 19 located at an end of the carriage 12 relative to a disk 11. An engaging element 23 is mounted on the one side of the carriage 12 for engagement with the screw groove 20a of the screw shaft 20 and has a pointed end portion 23b located adjacent an end of a spring plate 23a for direct engagement with the screw groove 20a of the screw shaft 20, and a holding portion 23c located in an opposing relationship to the pointed end portion 23b for holding the screw shaft 20 in cooperation therewith. The engaging element 23 thus determines a vertical position of the carriage 12 together with the guide bar 21. The carriage 12 and the stepping motor 13 including the screw shaft 20 for driving the carriage 12 thus constitute the feeding mechanism 14 for the carriage 12.

Figure 2:
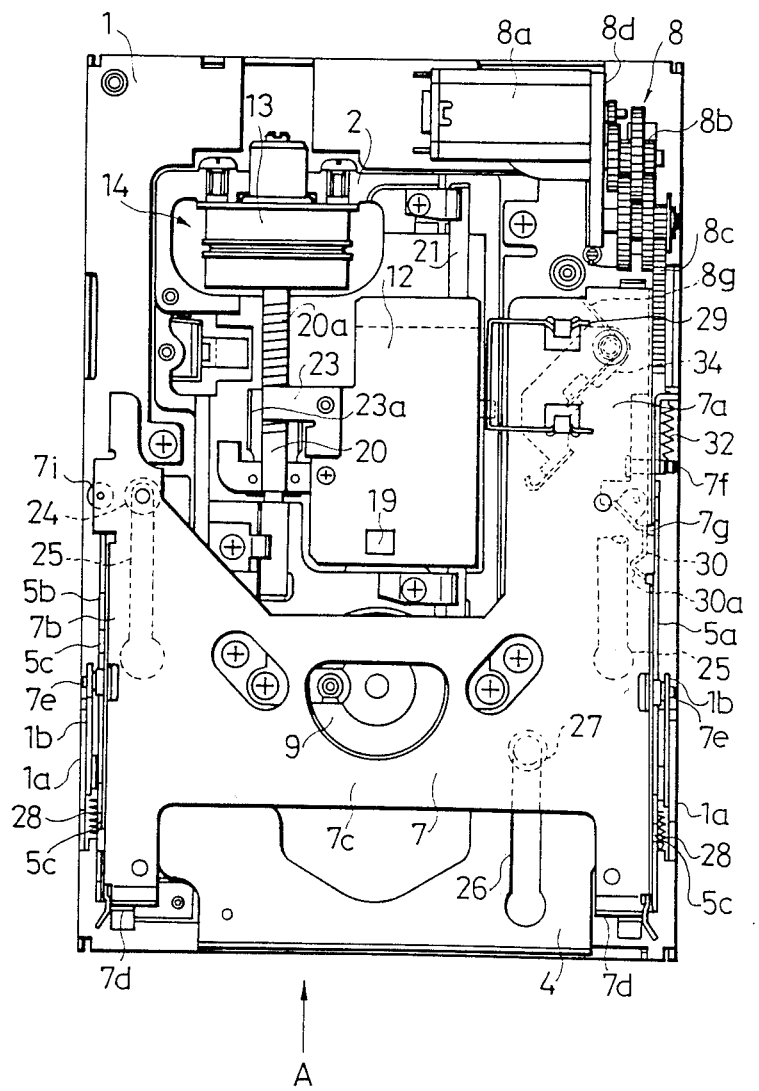
FIG. 2 is a plan view showing a general construction of an entire disk drive unit to which the zero track sensor of the first embodiment is applied.
Figure 3:
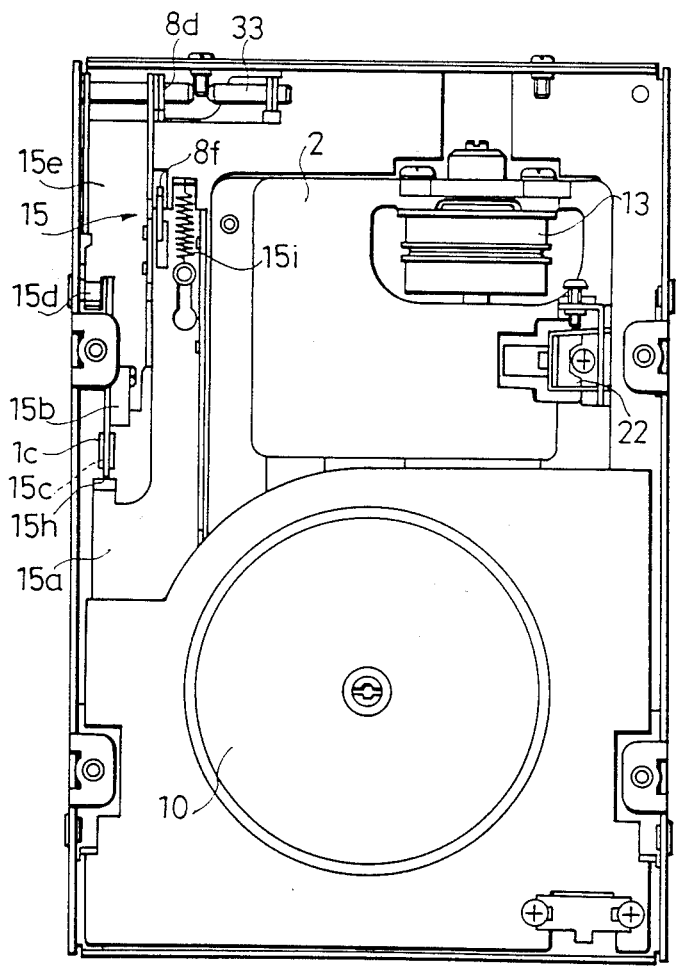
FIG. 3 is a bottom plan view of the disk drive unit of FIG. 2.
Figure 4:
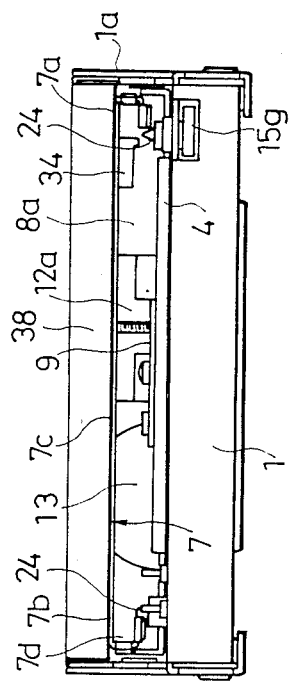
FIG. 4 is a front elevational view of the disk drive unit.
Figure 5:
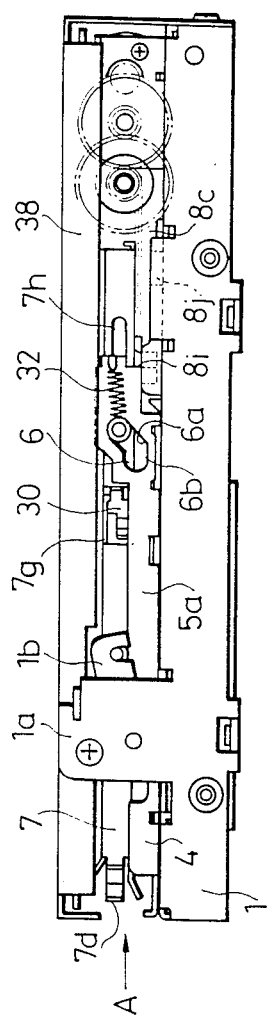
FIG. 5 is a right-hand side elevational view of the disk drive unit.

Referring now to FIGS. 2 and 5, the loading member 4 is mounted at a portion of the frame 1 adjacent the cartridge insertion side A and includes a right-hand side wall 5a, that is, a side wall on the right-hand side in those figures. The side wall 5a of the loading member 4 has a cam 6 including an inclined cam portion 6a and a parallel cam portion 6b and has a guide recess 5c formed therein. The loading member 4 further includes a left-hand side wall 5b having two guide recesses 5c formed therein. In addition, the loading member 4 has formed thereon a pair of guide slots 25 each for engaging with a positioning pin 24 for a cartridge 3 provided uprightly on the upper face of the frame 1, and another guide slot 26 for engaging with a pin 27 provided on the upper face of the frame 1, and thus the loading member 4 can slidably move along the guide slots 25 and 26. Meanwhile, the loading member 4 is normally urged toward the cartridge insertion side A by means of a spring not shown.

A pair of side plates 1a are formed to extend uprightly from opposite sides of the frame 1, and a pair of latching members 1b are located inside the side plates 1a and each have an end urged downwardly below the frame 1 by means of a spring 28.

Figure 14:
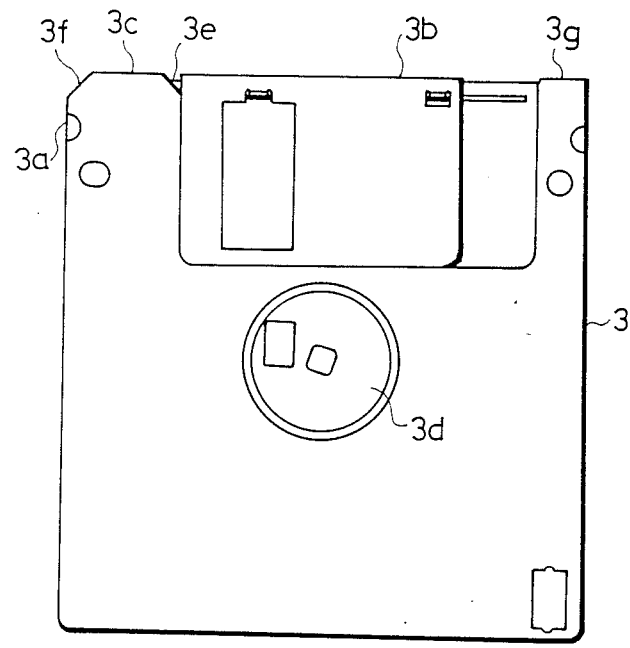
FIG. 14 is a bottom plan view of a cartridge to be driven by the disk drive unit.

The holder 7 for holding a cartridge 1 inserted in the unit has, as seen in FIGS. 2, 4, 7 and 8, a pair of channel-shaped cartridge holding portions 7a and 7b, and an integral interconnecting portion 7c formed from an elastic thin plate and interconnecting the cartridge holding portions 7a and 7b. The holder 7 further has a cartridge insertion opening 7d formed at a portion thereof adjacent the cartridge insertion side A. Each of the cartridge holding portions 7a and 7b of the holder 7 has formed therein a fixed projection 7e for engaging with the guide recess 5c and a movable projection 7f for engaging with the cam 6 of the loading member 4. The stroke of movement of the movable projection 7f is determined by the length of a guide slot 7h which is formed on a side face of the holder 7 and along which the movable projection 7f can move, and the stroke is smaller than a stroke of movement of the loading member 4. The difference between the strokes ensures at least a length of the inclined cam portion 6a of the cam 6 along a direction of the strokes. A supporting member 29 for moving up and down a loading arm 12a of the carriage 12, which will be hereinafter described, is removably located on a portion of the upper face of the cartridge holding portion 7a adjacent the movable projection 7f of the holder 7. A jointer 30 is located on the cartridge holding portion 7a on the same side and is movable together with the movable projection 7f. Only when the movable projection 7f is at its position nearest to the cartridge insertion opening 7d, the jointer 30 can be projected at an end portion thereof outwardly of the holder 7 from a relief slot 7g formed on a side of the cartridge holding portion 7a, and thus the end 30a of the jointer 30 can be engaged with an engaging recess 3a formed on one side of a cartridge 3 as shown in FIG. 14. The jointer 30 serves also as cartridge reverse insertion preventing mechanism by which means a cartridge 3 can be set in position if it is inserted in a correct orientation but otherwise if it is inserted in a wrong orientation, it is prevented from advancing to a predetermined position while the end 30a of the jointer 30 is prevented from engaging with the engaging recess 3a. Meanwhile, a guide roller 7i for controlling the posture of a cartridge 3 upon insertion to make the insertion smooth is mounted for rotation on a side face of the cartridge holding portion 7b of the holder 7 adjacent the stepping motor 13 and remote from the jointer 30. The holder 7 is constituted such as described above and is mounted on the loading member 4 in such a condition that both fixed projections 7e adjacent the cartridge insertion opening 7d are engaged with the latching members 1b and the movable projection 7f is engaged with the cam 6. The holder 7 is normally urged in the cartridge insertion direction by a spring 32 having an end connected to a terminal end of the loading member 4, that is, an end of the loading member 4 remote form the cartridge insertion side.

Figure 12:
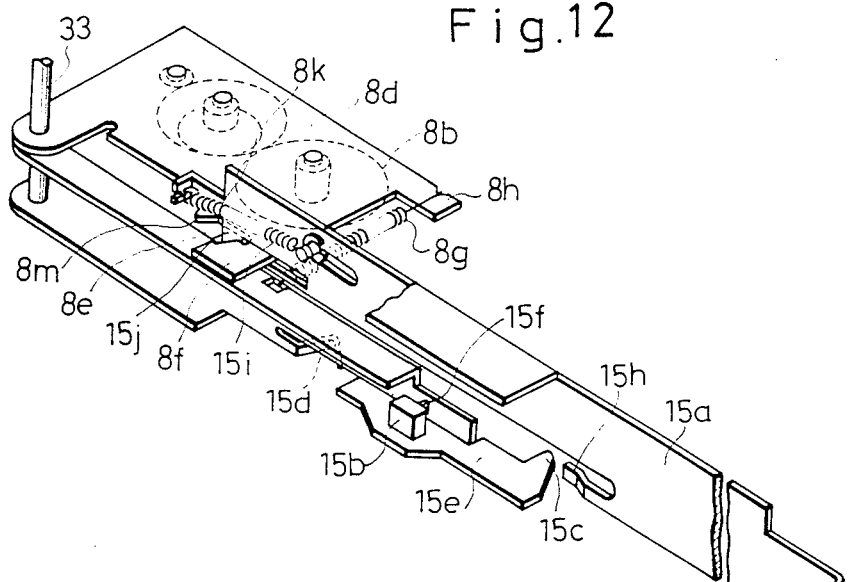
FIG. 12 is a perspective view illustrating a manual ejecting mechanism in an inoperative condition.
Figure 13:
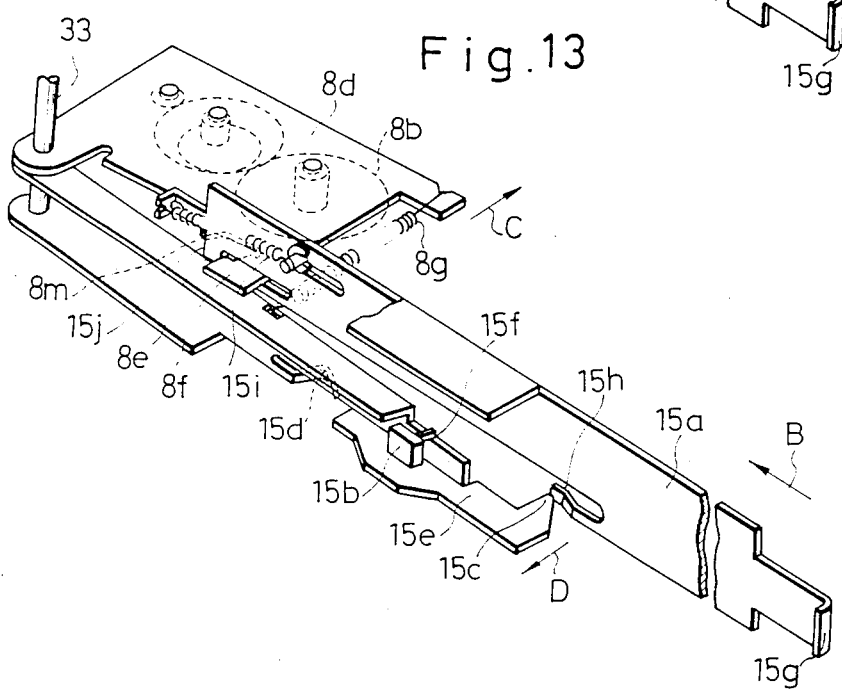
FIG. 13 is a similar view but illustrating the manual ejecting mechanism in an operative condition.

The loading member driving mechanism 8 is located at a portion of the frame 1 adjacent the terminal end of the loading member 4 adjacent the cartridge holding portion 7a of the holder 7. The loading member driving mechanism 8 includes a loading motor 8a, a gear train 8b connected to be driven by the motor 8a, and a rack 8c meshed with a last gear wheel of the gear train 8b. The loading member driving mechanism 8 is mounted on a support plate 8d for rocking motion in parallel with a plane of FIG. 5 around a support shaft 33 located on a lower face of the frame 1. As shown in FIGS. 12 and 13, the support plate 8d has a formed on a side thereof adjacent the holder 7 a projecting piece 8f which projects below the lower face of the frame 1 and has an engaging recess 8e formed thereon for engagement with an operating member 15a of the manual ejecting mechanism 15 which will be hereinafter described. The support plate 8d further has an engaging portion 8h for engaging with a spring 8g formed at an upper portion on the side thereof and is urged toward the frame 1 by the spring 8g. The rack 8c has an engaging recess 8i for engaging with part of the loading member 4 formed at a portion of an upper face thereof adjacent the loading member 4. The recess 8i is formed to have a length which ensures a predetermined stroke to allow a switching operation as hereinafter described. Further, the rack 8c has a recess 8j formed on a lower face of a substantially central portion thereof, and in a non-loading condition, part of a locking lever 15e as shown in FIG. 12 is loosely fitted in the recess 8j of the rack 8c.

The manual ejecting mechanism 15 located on the lower face of the frame 1 includes the operating member 15a extending from the cartridge insertion side A of the frame 1 to the projecting piece 8f, the support plate 8d, and the locking lever 15e having thereon a switch 15b for the loading motor 8a, a locking pawl 15c for the loading member 4 and an unlocking pawl 15d loosely fitted in the recess 8j of the rack 8c. The support plate 8d and the locking lever 15e are urged toward each other by the spring 8g. The switch 15b is located on a side face of the locking lever 15e and has a switching bar 15f projected to engage with the lower face of the frame 1. The switch 15b is so positioned that the switching bar 15f thereof is allowed to extend to effect a switching operation for the loading motor 8a as an end face of the loading member 4 engages with the locking pawl 15c to push down the locking lever 15e. Meanwhile, the operating member 15a has formed thereon an operating end 15g which can be pressed adjacent the cartridge insertion side A of the frame 1, and an abutting portion 15h which can be abutted with the locking pawl 15c when the operating member 15a is pressed. The operating member 15a is normally urged toward the cartridge insertion side by means of a spring 15i.

The holder 7 has a shutter opening and closing member 34 provided thereon which opens the shutter 3b when a cartridge 3 is inserted into the disk drive unit while the frame 1 has mounted at an upper portion thereof an upper lid 38 of a metal which protects the internal mechanisms and also serves as an electric shield.

Automatic Loading Operation

Now, different steps of an automatic loading operation of the disk drive unit having such a construction as described above will be described in order.

Figure 7:
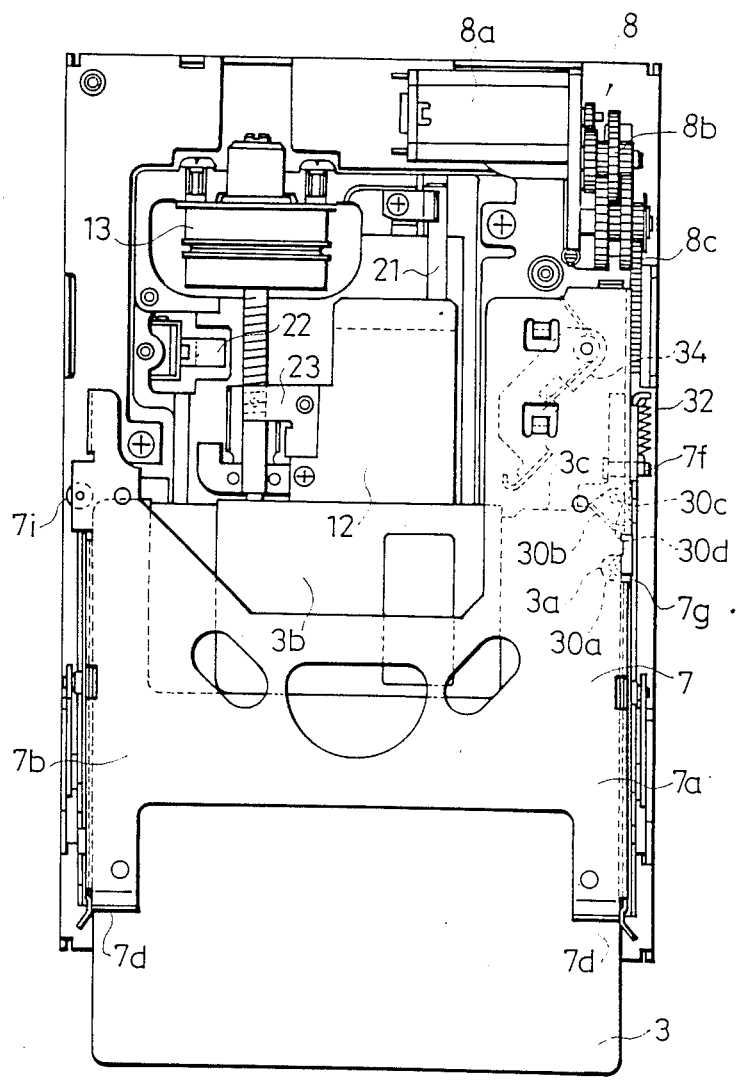
FIG. 7 is a plan view illustrating the disk drive unit just before automatic loading is started after a cartridge has been inserted to a predetermined position in a cartridge holder.
Figure 9:
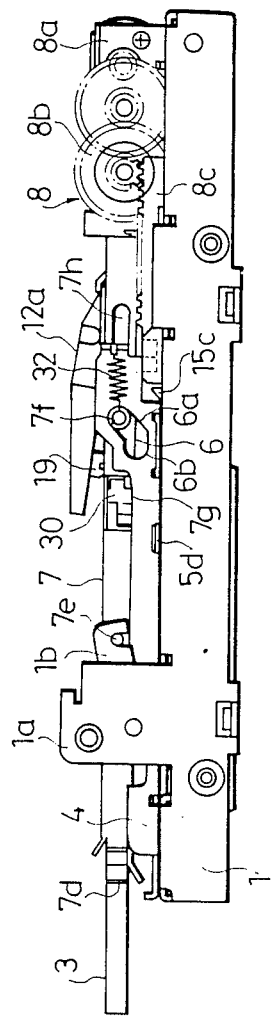
FIG. 9 is a side elevational view showing the disk drive unit in a condition similar to that of FIG. 7.
Figure 10:
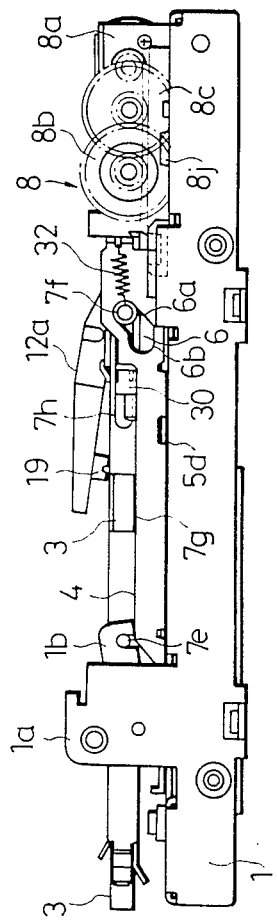
FIG. 10 is a similar view but illustrating the disk drive unit with the holder advanced to a position adjacent the turntable.

At first, when a cartridge 3 is inserted into the unit through the cartridge insertion opening 7d of the holder 7 as shown in FIGS. 7 and 9, if the cartridge 3 is in a correct orientation, no part of the cartridge 3 is abutted with an engaging portion 30d of the jointer 30 and hence the cartridge 3 is allowed to advance to its deepest position of the holder 7 until an inclined portion 3f formed at an end of an end portion 3c of the cartridge 3 is abutted with an opposing inclined portion 30b of the jointer 30 to set the cartridge 3 in position. As the inclined portion 3f of the cartridge 3 is thus abutted with the inclined portion 30b of the jointer 30, the jointer 30 is rotated in a clockwise direction around a shaft 30c until the end portion 30a of the jointer 30 which has projected sidewardly from the relief slot 7g of the holder 7 is engaged with the engaging recess 3a of the cartridge 3 to allow the cartridge 3 to be loaded toward the turntable 10.

On the contrary, if the cartridge 3 is inserted in an orientation other than the correct orientation, an angle portion of the cartridge 3 other than the inclined portion 3f, for example, and angle portion 3g of the end portion 3c of the cartridge 3, is abutted with the engaging portion 30d formed at a position nearer to the cartridge insertion opening 7d than the inclined portion 30b. As a result, the cartridge 3 cannot be inserted substantially further than the position of the engaging portion 30d, and hence the end portion 30a of the jointer 30 cannot be engaged with the engaging recess 3a of the cartridge 3. Accordingly, the cartridge 3 can only be inserted loosely into the holder 7 and cannot be loaded in position.

Then, after the cartridge 3 has been thus inserted in the correct orientation and set in position, if it is pushed to move slightly in the cartridge insertion direction, that is, toward the magnetic head 19, the loading member 4 follows it to move slightly in the same direetion so that the locking pawl 15c of the locking lever 15 which projects from a lower face to and above an upper face of a slot 1c of the frame 1 is pushed down below the frame 1 by the loading member 4. As the locking lever 15e is pushed down in this way, the switching bar 15f of the switch 15b is extended to a position below the frame 1 to close contacts of the switch 15b to start energization of the loading motor 8a by way of a controlling circuit not shown. As the loading motor 8a is thus energized, it starts its rotation in a loading direction. By the rotation of the loading motor 8a in the loading direction, the rack 8c is moved in the loading direction by way of the gear train 8b, and the loading member 4 is moved in the same direction thereby. When the cartridge 3 comes to a last end of the guide slot 7h in the advancing direction while it is pulled by the jointer 30 as the loading member 4 is thus moved, a hub 3d of the cartridge 3 is positioned just above the turntable 9. If the rack 8c is moved further in the loading direction from this position, the loading member 4 is further moved in the same direction by the further movement of the rack 8c while the holder 7 maintains its position in a parallel direction relative to the frame 1. Accordingly, the movable projection 7f which is in engagement with the cam slot of the cam 6 is lowered along the inclined cam portion 6a, and the entire holder 7 is lowered in consequence therewith. Then, when the movable projection 7f comes to the parallel cam portion 6b, the fixed projection 7e is not engaged with the guide recess 5c in the associated side plate of the loading member 4 to position the cartridge 3 to a predetermined position. In this instance, the locking pawl 15c is guided into a slot 5d formed in the loading member 4, and at the same time the switching member 15e is guided onto the frame 1 to open the switch 15b to stop the loading motor 8a.

Figure 11:
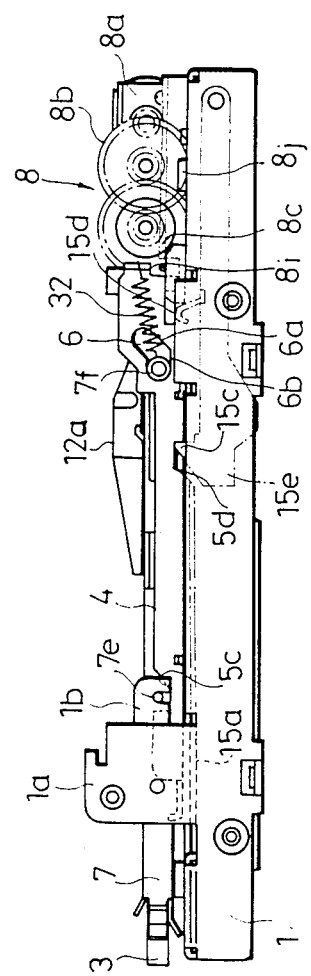
FIG. 11 is a similar view but illustrating the disk drive unit in a condition similar to that of FIG. 8.

Meanwhile, since the loading arm 12a is supported on the supporting member 29 located on an upper face of the holder 7, it is spaced from the carriage 1 below while the holder 7 is at its upper position, and in this position of the loading arm 12a, the cartridge 3 can be inserted between the loading arm 12a and the magnetic head 19 located on the carriage 12. Accordingly, until the cartridge 3 comes to a position just above the turntable 9, the loading arm 12a is held spaced from the cartridge 3, and then as the holder 7 is lowered, the loading arm 12a is also lowered gradually. Thus, when a disk 11 is placed on the turntable 9, the magnetic head 19 on the loading arm 12a is contacted with an upper face of the disk 11. In this position, a lower face of the disk 11 is in contact with the magnetic head 19 on the carriage 12 to allow recording and reproduction on and from opposite faces of the disk 11 (FIGS. 8 and 11).

Figure 8:
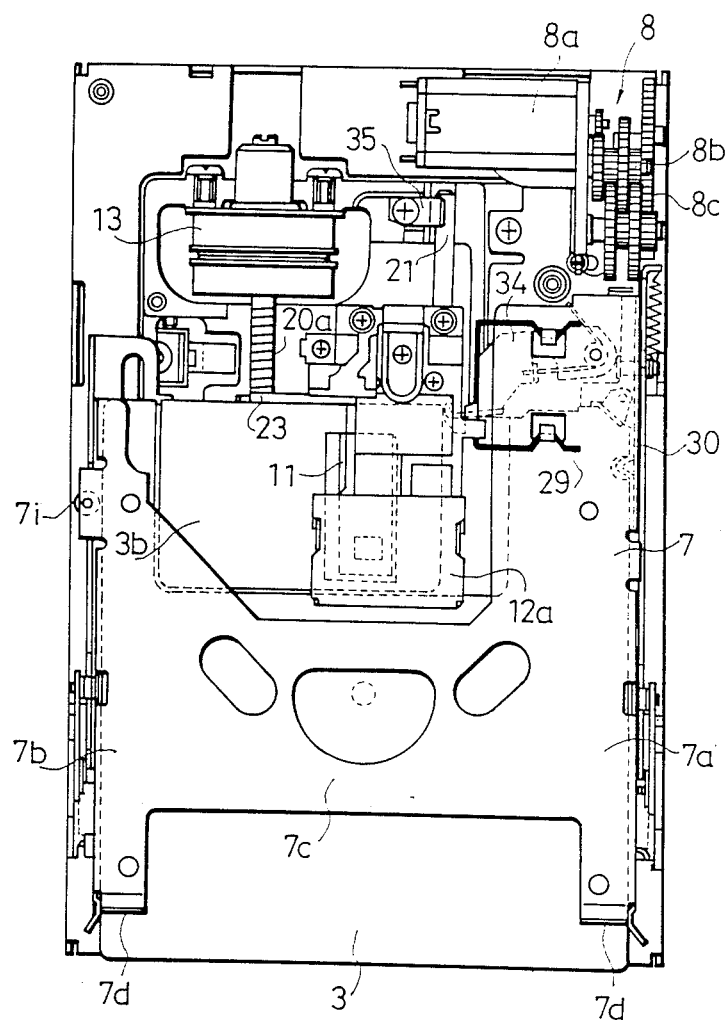
FIG. 8 is a similar view but illustrating the disk drive unit with a disk placed on a turntable.

In the meantime, as the cartridge 3 is inserted, an end portion of the shutter opening and closing member 34 located in the cartridge holding portion 7a of the holder 7 is engaged with a shutter opening and closing recess 3e formed at an end portion 3c of the cartridge 3 to slide the shutter 3b in a horizontal direction as shown in FIG. 8, and when the cartridge 3 comes to a position just above the turntable 9, the shutter 3b for a cartridge 3 is opened completely. Since upon opening and closing of the shutter the shutter opening and closing member 34 is in a position in which it presses laterally against a side face of the shutter 3b, when the cartridge 3 is to be ejected, as the cartridge 3 moves back, the shutter 3b is closed by an action of a spring not shown which normally urges the shutter 3b in its closing direction within the cartridge 3.

Automatic Ejecting Operation

Now, an operation for automatic ejection will be described.

The operation for automatic ejection proceeds substantially reverse to the operation for automatic loading as described above and hence will be described only briefly. At first, if recording or reproduction of a disk 11 comes to an end and an ejection signal is issued from a controlling circuit not shown, the loading motor 8a starts is rotation but in a direction reverse to that of the rotation for loading. As the loading motor 8a starts its reverse rotation, the rack 8c begins its movement toward the cartridge insertion side A by way of the gear train 8b. As the rack 8c thus starts its movement, the end portion of the rack 8c is engaged with the unlocking pawl 15d to push down the locking lever 15e below the frame 1. As the locking lever 15e is thus pushed down, the locking pawl 15c at the end of the locking lever 15e is also lowered and brought out of engagement with the slot 5d of the loading member 4. As the locking pawl 15c is thus disengaged from the slot 5d, the loading member 4 is allowed to move in an ejecting direction. As a result, the loading member 4 is moved in the ejecting direction by an action of the loading motor 8a and the gear train 8b. When the loading member 4 comes to a predetermined position (initial position before insertion), the locking pawl 15c which has engaged with a lower face of the loading member 4 is allowed to project above the upper face from the slot 1c of the frame 1 to lock the end portion of the rack 8c while at the same time the locking lever 15e is raised. As a result, the switch 15b is opened to stop rotation of the loading motor 8a, thereby completing the ejecting operation. In this position, the cartridge 3 is projected a predetermined length from the holder 7 with the shutter 3b closed. Accordingly, the cartridge 3 will be removed with the projected end of the cartridge 3 gripped by hand.

Manual Ejecting Operation

Even on a disk drive unit which employs an automatic loading and an automatic ejecting mechanisms having such constructions as described above, sometimes a cartridge 3 may not be unloaded from the disk drive unit because of interruption of power or due to a trouble of the unit during use. In order to eliminate this, it is necessary for the disk drive unit to have a provision for ejecting a cartridge 3 only by means of a mechanical system without an electric system included therein. The manual injecting mechanism 15 provided in the disk drive unit provides for such an emergency as described above, and in the manual ejecting mechanism 15, a cartridge 3 can be ejected only by depression at the operating end 15g of the operating member 15a. Thus, a manual ejecting operation in the present embodiment will be described below.

FIG. 12 is a perspective view, partly omitted, illustrating relative positions of of pertaining components of the manual injecting mechanism 15 in its inoperative condition. In this condition, the support plate 8d and the locking lever 15e are drawn toward each other by the spring 8g so that the last gear of the gear train 8b is engaged with the rack 8c and the locking lever 15e is contacted with the lower face of the frame 1 while the locking pawl 15c and the unlocking pawl 15d project upwardly from the upper face of the frame 1. An operative end 15j of the operating member 15a is engaged with an engaging recess 8e of the projecting piece 8f formed on the lower side of the support plate 8d on which the gear train 8b is installed. The engaging recess 8e is formed as a cam recess and has a parallel portion 8k and an inclined portion 8m. Thus, the operative end 15j of the operating member 15a is normally contacted with a portion of the parallel portion 8k of the engaging recess 8e adjacent the cartridge insertion side A.

For manual ejecting operation, the operating end 15g of the operating member 15a will be depressed in a direction of an arrow mark B as seen in FIG. 13 until the operative end 15j of the operating member 15 is abutted with the inclined portion 8m of the engaging recess 8e of the support plate 8d. If the operating member 15a is depressed further, the support plate 8d is pivoted in a direction of an arrow mark C around the support shaft 33 in accordance with the inclined portion 8m of the engaging recess 8e. As the support plate 8d is thus pivoted in the direction C, the gear train 8b is lifted accordingly so that the last gear of the gear train 8b is disengaged from the rack 8c, thereby freeing the rack 8c. After then, the abutting portion 15h of the operating member 15a is abutted with the locking pawl 15c of the locking lever 15e to pivot the locking lever 15e in a direction of an arrow mark D around the support shaft 33, and then if the operating member 15a is further depressed, the locking pawl 15c is abutted with a lower face of the abutting portion 15h of the operating member 15a. As the locking pawl 15c of the operating member 15a is engaged with the lower face of the engaging portion 15h, locking of the locking pawl 15c is released so that the loading member 4 is returned to its initial position adjacent the cartridge insertion side A by an elastic force of a spring not shown. Meanwhile, the holder 7 is lifted to release the loading arm 12a so that the cartridge 3 is returned to its position when it was inserted. After then, if the operating end 15g of the operating member 15a is released, the operating member 15a is also returned to its condition before its operation by an elastic force of the spring 15i and simultaneously the entire mechanisms are returned to their initial positions before the cartridge 3 was inserted, thereby making preparations for a subsequent next operation.

In the returning mechanism, lifting of the support plate 8d and pressing down of the locking lever 15e may be effected in a short stroke making use of an inclined face of a cam, and all the returning operations are derived from elastic forces of springs. Accordingly, a manual ejecting operation can be performed by a very small force.

Zero Track Sensor

Referring now to FIGS. 1(a) to 1(e), the zero track sensor 22 installed at a predetermined position on the housing 2 includes a photosensor 22a, a mounting member 22b on which the photosensor 22a is mounted, and a base member 22c on which the mounting member 22b is supported by means of legs 22e. The photosensor 22a, the mounting member 22b and the base member 22c are formed in an integral relationship into a photosensor block.

The photosensor 22a has a gap 22q formed therein through which the shutter member 23d of the engaging element 23 on the carriage 12 can pass. The photosensor 22a further has a pair of slits 22r formed at portions thereof on opposite sides of the gap 22q. A light emitting element and a light receiving element not shown are located behind the slits 22r, and thus a path of a light beam is provided between the slits 22r.

The mounting member 22b includes a mounting plate on which the photosensor 22a is mounted, and a pair of parallel legs 22e formed by bending part of edge portions of the mounting plate 22d. The legs 22e have an elasticity and each have a mounting portion 22f to the base member 22c formed at an end thereof by cutting away part of an end face thereof. The mounting plate 22d on which the photosensor 22a is mounted has a substantially rectangular mounting hole 22g formed therein in which the photosensor 22a is fitted.

The base member 22c includes a base plate 22i having engaging slots 22h perforated therein in which the mounting portions 22f of the legs 22e of the mounting member 22b are inserted, an integral adjusting member mounting plate 22j formed to extend uprightly from the base plate 22i as from the lower side of FIG. 1(a) or 1(c), and an integral mounting plate 22o formed to extend in a same direction with the adjusting member mounting plate 22j from a side edge of the base plate 22e. The adjusting member mounting plate 22j has a bolt hole 22l formed therein in which a bolt 22k serving as an adjusting member is threadably engaged while the mounting plate 22o has a hole 22n formed therein in which a bolt (not shown) for securing the base plate 22c to the housing 2 is inserted.

Figure 1B:
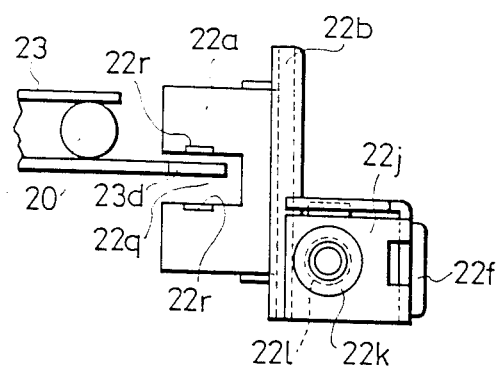
FIG. 1(b) is a front elevational view illustrating the zero track sensor and the shutter of FIG. 1(a)

The three elements described just above are combined as particularly seen in FIGS. 1(a), 1(b) and 1(c) such that the photosensor 22a is mounted in the mounting hole 22g of the mounting member 22b and the mounting portions 22f of the legs 22e of the mounting member 22b are inserted in the engaging slots 22h of the base plate 22i of the base member 22c with recessed portions of the mounting portions 22f engaged with edges of the engaging slots 22h to mount the mounting member 22b on the base plate 22i. In this instance, the legs 22e, the mounting plate 22d and the base plate 22i generally present a substantially parallelepiped geometry as seen in FIG. 1(a). After the legs 22e have been mounted on the base plate 22i, a bolt 22k is screwed into the bolt hole 22l of the adjusting member mounting plate 22j until an end thereof is abutted with a side face of one of the legs 22e. In this condition, the zero track sensor 22 is mounted at a zero track sensor mounting portion 22p formed on the housing 2 by means of a bolt 22m from below the housing 2, that is, at a position in which the shutter member 23d can pass through the gap 22q.

By constituting the zero track sensor 22 in such a manner as described above, it is made possible to mount the photosensor block as a single block on the housing 2 and position the magnetic head 19 to the zero track position in which relative positions of the shutter member 23d and the slits 22r are adjusted. In particular, if the magnetic head 19 is brought to the zero track position, the shutter member 23d is substantially positioned near a light path between the slits 22r, and then if the bolt 22k is turned to press against one of the legs 22e from sidewardly, the positions of the slits 22r are displaced substantially in parallel relationship in accordance with an extension of the bolt 22k. Here, a position in which a sufficient signal output can be obtained by interception of a light beam along the light path by the shutter member 23d is found by adjustment of the bolt 22k, and if the photosensor 22a is positioned there, the position for detection of the zero track can be determined with accuracy.

In the course of the adjusting process, adjustment of the position of one of the slits 22r can be carried out only by turning of a bolt 22k, and in this instance, wherever the other opposing slit 22r is positioned then, it will move substantially in parallel relationship to an end edge of the shutter member 23d. Accordingly, an output characteristic (resolution) of a detection signal caused by interception of a light beam is stabilized independently of the positions of the slits. In the meantime, while the legs 22e are mounted only by engagement of the mounting portions 22f in the engaging slots 22h, they will not be let out of the base plate 22i since they are made of an elastic material and are always subject to a pressing force by the bolt 22k.

Figure 15A:
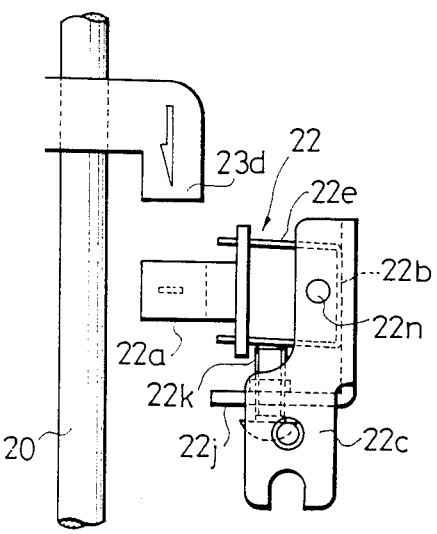
FIG. 15(a) is a plan view illustrating a zero track sensor according to a second embodiment of the invention and a shutter for cooperation therewith.
Figure 15B:
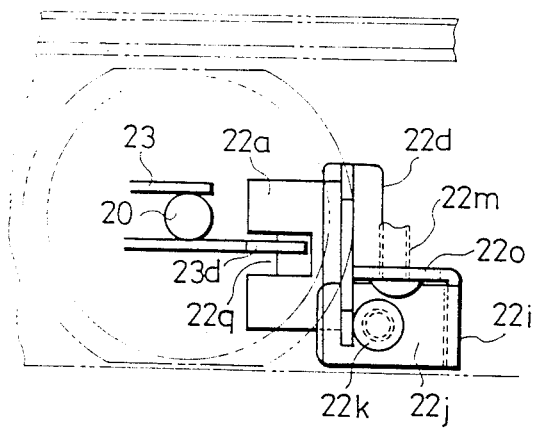
FIG. 15(b) is a front elevational view of the zero track sensor and the shutter of FIG. 15(a)
Figure 16:
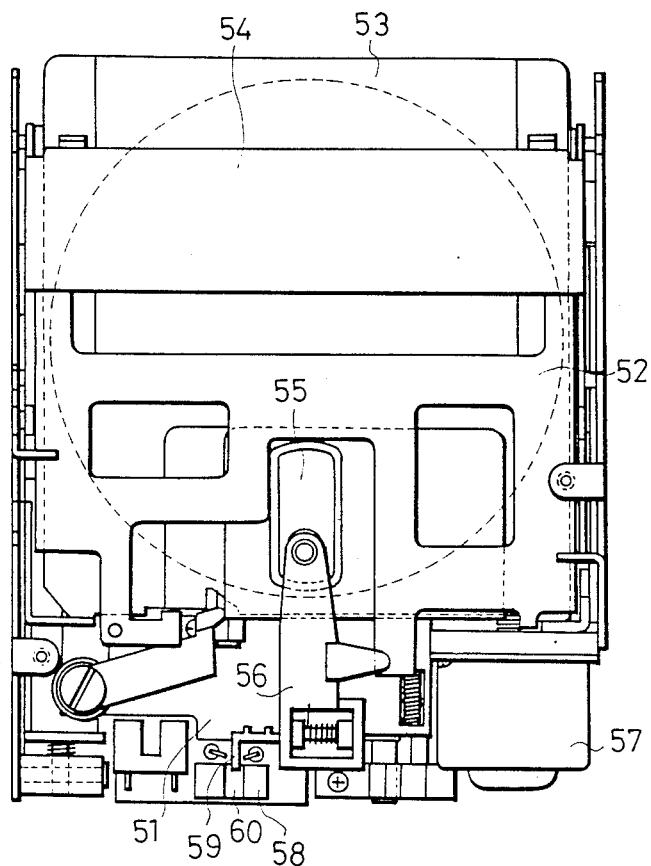
FIG. 16 is a plan view illustrating a disk drive unit which incorporates a conventional photosensor therein.

A second embodiment of the present invention is illustrated in FIGS. 15(a) and 15(b). In the second embodiment, the mounting member 22b as in the first embodiment is set substantially in a reverse orientation. The second embodiment will be described below.

FIGS. 15(a) and 15(b) illustrate a zero track sensor of the second embodiment, and FIG. 15(a) is a plan view of the zero track sensor, and FIG. 15(b) a front elevational view of the zero track sensor. Referring to FIGS. 15(a) and 15(b), the zero track sensor 22 includes a photosensor 22a, a mounting member 22b and a base member 22c. The mounting member 22b has a pair of substantially parallel legs 22e of an elastic material formed to extend therefrom toward the photosensor 22a. The legs 22e extend from a side adjacent a base plate 22i on the contrary to the first embodiment, and the photosensor 22a is mounted at mounting portions 22f adjacent free ends of the legs 22e. A bolt 22k is threadably engaged with an adjusting member mounting plate 22j formed by bending in a similar manner and is abutted at an end thereof with a side face. of one of the legs 22e of the mounting member 22b so that the position of the photosensor 22a can be adjusted by turning the bolt 22k. Other portions which are not particularly described are constituted in a similar manner to those of the first embodiment.

Also in this case, the mounting portions 22f are only engaged with and not secured to base portions of the photosensor 22a. Accordingly, the slits 22r can move substantially in parallel relationship, allowing similar operations to those of the first embodiment to be attained.

As apparent form the foregoing description, according to the two embodiments, a photosensor block is formed by engaging a mounting member 22b on which a photosensor 22a is mounted with a base member with which a bolt 22k as an adjusting member is threadably engaged. By this construction, following various effects can be presented:

(1) components of the photosensor block are simple in shape and can be assembled easily, and hence the photosensor block can be produced at a reduced cost and is good for aftercare;

(2) adjusting operations can be made easier and accuracy in adjustment is improved since the position of a photosensor can be adjusted only by turning an adjusting member (bolt);

(3) resolution of the photosensor is not deteriorated and an output can be stabilized since slits for the photosensor move substantially in parallel relationship relative to a shutter member; and (4) if components such as a mounting member, a base member and a bolt are made of a metal material or materials, then a change due to a change of temperature can be reduced and influences of the humidity can be eliminated.

It is to be noted that while in the two embodiments the legs 22e each made of an elastic member in the form of a plate are each formed by an extension or projection from the body of the mounting member 22b, they can naturally be formed only from two separate parallel flat plates.

Further, while in the embodiments a zero track sensor of the invention is applied to a disk drive unit of the automatic loading type, it can naturally be applied to any device or appliance which employs a photosensor to effect controlling of a position.

Effect of the Invention

Since a photosensor block according to the present invention has such a construction as described above, it has an effect that adjustment of the position of a photosensor can be effected easily with accuracy.

What is claimed is:

1. A photosensor block including an adjustable mounting structure for a photosensor included in said block, said photosensor block comprising:
    a photosensor;
    a photosensor mounting member for receiving and supporting said photosensor, said photosensor mounting member including a pair of parallel elastic members each in the form of a plate with an integral mounting plate extending between adjacent ends of said elastic members; and
    a base member adapted to support said photosensor mounting member with said elastic members extending from said base member, said base member including an adjusting member mounted on said base member in operative relationship with said elastic members such that a portion of said adjusting member presses against a side face of one of said elastic members to permit fine adjustment of the position of said photosensor.

2. A photosensor block according to claim 1, including means attaching said mounting plate to said base member and wherein said photosensor is supported between said elastic members.

3. A photosensor block according to claim 1, wherein said base member includes a first portion and wherein said mounting plate, said pair of elastic members, and said first portion of said base member make up four sides of a parallelepiped.

4. A photosensor block according to claim 1, wherein said base member includes an adjusting member mounting plate which is oriented substantially parallel to at least one of said elastic members and wherein said adjusting member mounting plate includes an aperture for receiving and supporting said adjusting member.

5. A photosensor block according to claim 3, wherein said first portion of said base member includes a pair of engagement slots and said pair of elastic members each have a slotted portion located on the outermost ends thereof for slidably securing the outermost end in a respective one of said engagements slots in said base member.

6. A photosensor block according to claim 4, wherein said adjusting member is elongated and is supported by said adjusting member mounting plate such that the longitudinal axis of said adjusting member is oriented substantially perpendicular to said side of one of said elastic members, and further wherein said adjusting member includes a first end and a second end, said first end for contacting said side face of said elastic member and said second end for rotating said adjusting member in said aperture.

7. A photosensor block according to claim 6, wherein said adjusting member is threaded and rotatably supported in said aperture whereby rotation of said adjusting member in said aperture causes said adjusting member to contact said side face of said elastic member and thereby to move said elastic member incrementally, said incremental movement causing an incremental shift in the position of said photosensor mounting member and said photosensor.

* * * * *